July 31, 1923.
E. STAAKE
BALL CAGE FOR RADIAL BALL BEARINGS
Filed Sept. 10, 1921
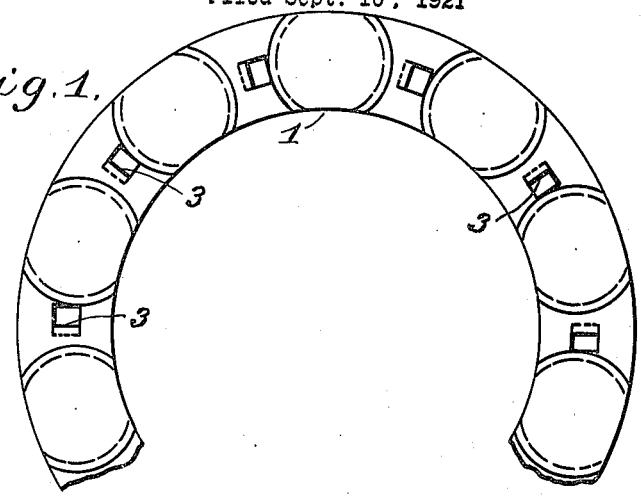
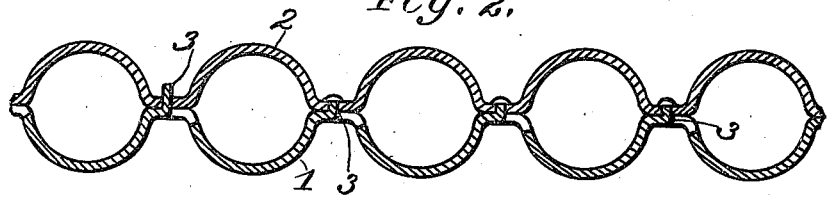
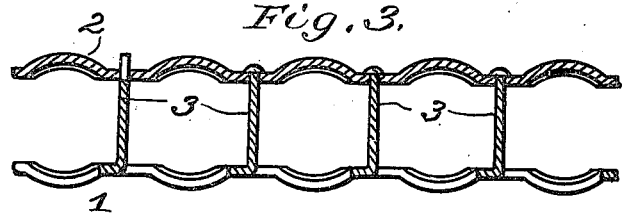
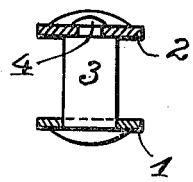 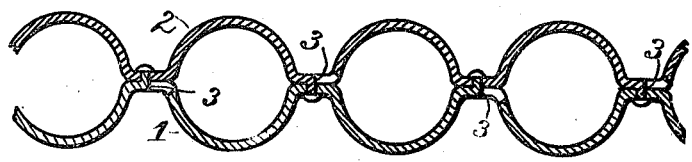
INVENTOR
Emil Staake
BY
Rogers, Kennedy Campbell
ATTYS.

Patented July 31, 1923.

1,463,299

UNITED STATES PATENT OFFICE.

EMIL STAAKE, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL CAGE FOR RADIAL BALL BEARINGS.

Application filed September 10, 1921. Serial No. 499,781.

*To all whom it may concern:*

Be it known that I, EMIL STAAKE, a subject of the King of Sweden, residing at Gottenborg, in the Kingdom of Sweden, have invented new and useful Improvements in Ball Cages for Radial Ball Bearings, of which the following is a specification, reference being had to the drawing accompanying and forming a part thereof.

This invention relates to such ball cages for radial ball bearings which consist of rings placed at either side of the row or rows of balls, respectively, and provided, preferably, with seats for the balls. In ball cages of that kind, as hitherto known, the said rings have been secured to one another by means of screws or loose rivets. The screw connection, however, is insufficient, and the loose rivets are inconvenient to place in the holes to that end provided in the rings, because this must generally take place, after the balls and the cage rings have been placed in the bearing. It has also been proposed to provide the rings with projecting lugs or the like serving as partition walls which have, after suitable bending and pressing, been secured to the opposite cage ring by riveting. Such an embodiment entails, however, a considerable loss of material and is on account thereof expensive.

This invention has for its object to avoid the above drawbacks and to bring about a ball cage which, at the same time as it is simple and cheap in manufacturing, facilitates a reliable connection of the cage rings. The invention consists, chiefly, in this, that lugs or the like are stamped out of the ring material proper, which lugs are bent over and introduced with the free end through holes in the opposite cage ring and riveted. By this a reliable securing of the rings of the ball cage is performed and no additional material, more than the ring material proper, is required for forming the rivets.

In the annexed drawing two forms of embodiment of a ball cage according to this invention are shown. Fig. 1 is an end view of a ball cage according to the one form of embodiment. Fig. 2 is a longitudinal section thereof, developed in a plan. Fig. 3 is a longitudinal section of a somewhat modified ball cage, developed in a plan. Fig. 4 is a cross-section thereof. Fig. 5 is a longitudinal section of a further modification developed in plan.

The ball cage shown in Figs. 1 and 2, consists, in known manner, of two rings 1 and 2 having semispherical seats for the balls. In the form of embodiment shown, lugs 3 are stamped out of the ring 1, said lugs being bent over and introduced through holes in the opposite ring 2 and riveted. The parts of the rings 1 and 2 located between the ball sockets lie in this form of embodiment close to one another.

The form of embodiment of the ball cage shown in Figs. 3 and 4, by which the parts of the rings 1 and 2 located between the ball sockets lie at a certain distance from one another, differs in other respects from the form of embodiment according to Figs. 1 and 2 by this only that the lugs 3 stamped out of the ring material form also partition walls between the adjacent ball sockets. The lugs 3 forming said partition walls may in this case, preferably, be made wider than in the form of embodiment according to Fig. 1 and provided at the free end with a narrower tongue 4, which is introduced through the hole in the opposite ring 2 and riveted.

Obviously, the ball cage may also be made for multiple row radial ball bearings and, furthermore, the lugs forming the rivets may, if desired, be stamped alternately out of both rings. Besides, the lugs may be stamped out at corresponding places in both rings so as to form at each joint a double rivet, whereby the parts of the lugs projecting at the one side of each ring may be bent in opposite directions. The lugs may also, if desired, be secured to the opposite ring by welding.

I claim:

1. A ball cage for single or multiple row radial ball bearings, consisting of rings placed at either side of the row or rows of balls, respectively, and provided, preferably, with seats for the balls, characterized by this that lugs or the like are stamped out of the ring material proper between the edges of the same, said lugs being bent over and introduced with the free end through holes in the opposite cage ring and riveted or welded.

2. A ball cage according to claim 1 characterized by the fact that the lugs form partition walls between adjacent ball sockets.

3. A ball cage according to claim 1 characterized by the fact that the lugs are stamped out alternately from both of the cage rings.

4. A ball cage for ball bearings comprising opposing rings adapted to receive the balls between them, and lugs on one of the rings extending through holes in the other ring and engaged fixedly therewith to hold the rings together, said lugs consisting of portions of the ring separated from the metal thereof wholly between the edges of the ring and extending laterally to engage the other ring.

In testimony whereof I have signed my name.

EMIL STAAKE.